(12) United States Patent
Delrue et al.

(10) Patent No.: US 10,905,281 B2
(45) Date of Patent: Feb. 2, 2021

(54) AIRFLOW COOKING DEVICE

(71) Applicant: SEB S.A., Ecully (FR)

(72) Inventors: Olivier Delrue, Selongey (FR); Jérémy Cornu, Dijon (FR); Jean-Claude Bizard, Fontaine les Dijon (FR)

(73) Assignee: SEB S.A.

( * ) Notice: Subject to any disclaimer, the term of this patent is extended or adjusted under 35 U.S.C. 154(b) by 155 days.

(21) Appl. No.: 16/078,108

(22) PCT Filed: Feb. 10, 2017

(86) PCT No.: PCT/FR2017/050314
§ 371 (c)(1),
(2) Date: Aug. 21, 2018

(87) PCT Pub. No.: WO2017/144795
PCT Pub. Date: Aug. 31, 2017

(65) Prior Publication Data
US 2020/0214498 A1    Jul. 9, 2020

(30) Foreign Application Priority Data
Feb. 22, 2016   (FR) ..................................... 16 51436

(51) Int. Cl.
*A47J 37/06*   (2006.01)

(52) U.S. Cl.
CPC ................. *A47J 37/0641* (2013.01)

(58) Field of Classification Search
CPC ............... A47J 37/0641; A47J 37/1266; A47J 37/1271; A47J 37/1257; A47J 36/165; A47J 27/004; A47J 36/32; A47J 27/002; A47J 37/043; A47J 37/0623

USPC ......... 99/325, 326, 327, 331, 332, 333, 342, 99/344, 345, 348, 447, 468, 470, 473, 99/474, 475, 476, 486; 219/385, 400, 219/469, 470, 501, 534, 542, 546, 548

See application file for complete search history.

(56) References Cited

U.S. PATENT DOCUMENTS 5,588,353 A * 12/1996 Glucksman ............ A21B 7/005
99/348
2008/0213447 A1* 9/2008 Payen .................... A47J 37/043
426/438

FOREIGN PATENT DOCUMENTS

| DE | 20 2005 021931 U1 | 8/2011 |
| EP | 1 781 154 A2 | 5/2007 |
| WO | WO 2006/000699 A2 | 1/2006 |
| WO | WO 2014/125200 A1 | 8/2014 |

(Continued)

OTHER PUBLICATIONS

International Search Report as issued in International Patent Application No. PCT/FR2017/050314, dated May 22, 2017.

*Primary Examiner* — Phuong T Nguyen
(74) *Attorney, Agent, or Firm* — Lerner, David, Littenberg, Krumholz & Mentlik, LLP

(57) ABSTRACT

A cooking appliance includes a ventilation system arranged to create an airflow in a cooking space of the appliance; a cooking basket, arranged to receive food products to be cooked in the cooking space and allowing the airflow to pass through a bed of food products to be cooked; a heating system arranged to heat the airflow, wherein the ventilation system includes a cross-flow fan, and wherein, in the airflow, the heating system is arranged downstream of the ventilation system, the cooking basket is arranged downstream of the heating system.

9 Claims, 1 Drawing Sheet

(56) References Cited

FOREIGN PATENT DOCUMENTS

WO    WO 2014/195129 A1    12/2014

* cited by examiner

AIRFLOW COOKING DEVICE

CROSS-REFERENCE TO RELATED APPLICATIONS

This application is the U.S. National Stage of PCT/FR2017/050314 filed Feb. 10, 2017, which in turn claims priority to French patent application number 1651436 filed Feb. 22, 2016. The content of these applications are incorporated herein by reference in their entireties.

This invention concerns in general a domestic cooking appliance, and in particular a portable or transportable airflow cooking appliance.

Convection or airflow cooking appliances are known in the prior art, such as the one presented in the document WO2014195129A1. On the other hand, the system described has in particular the disadvantage of proposing a complex structure for the airflow, and in the end one that is inefficient for cooking food products quickly.

One goal of this invention is to respond to the aforementioned disadvantages of the prior art documents and in particular, first, to propose a simple cooking appliance that still allows food products to be cooked efficiently.

To this end, a first aspect of the invention concerns a cooking appliance comprising:

ventilation means arranged to create an airflow in a cooking space of the appliance, a cooking basket, arranged for receiving food products to be cooked in the cooking space and allowing the airflow to pass through a bed of food products to be cooked, heating means arranged for heating the airflow, characterized in that the ventilation means comprise a cross-flow fan, and in that in the airflow:

the heating means are arranged downstream of the ventilation means, the cooking basket is arranged downstream of the heating means. The cooking appliance according to this implementation is simple in its architecture, since the airflow created by the ventilation means goes directly from the latter to the heating means, and then over and through the bed of food products. In other words, the airflow does not encounter obstacles between the ventilation means, the heating means, and then the food products to be cooked. In addition, this architecture reduces heat losses, since the airflow, once heated by the heating means, goes directly over the food products to be cooked in order to pass through the bed of food products. This improves the efficiency. In this way, the power of the heating elements can be reduced while maintaining identical cooking times. Finally, a cross-flow fan, also known as a tangential fan (or turbine), is quiet, making it more comfortable to use.

Advantageously, the heating means are joule effect heating means. Such heating allows heat to be transferred quickly to the airflow.

Advantageously, the heating means comprise a heating wire of a predetermined diameter, wound around a flat support such as a mica on a plurality of turns, and the wire of one turn is spaced from the wire of the adjacent turn by a distance of at least 1.5 times the diameter of the wire. A heating wire presents low thermal inertia, which further shortens the cooking time. In addition, the space between the turns or windings guarantees good convection with the airflow: pressure losses are low, and the heating wire is cooled efficiently, which guarantees its longevity.

Advantageously, the flat support of the heating means is arranged so as to be substantially parallel to a direction of flow of the airflow at the heating means, and/or each turn of heating wire presents two substantially straight portions aligned with said direction of flow of the airflow. Pressure losses are further limited, the ventilation is then efficient.

Advantageously, the cooking appliance comprises an intake area upstream of the ventilation means, arranged between the cooking space and the ventilation means, and in communication with the ventilation means through an intake nozzle. Such an intake area allows optimal operation of the cross-flow fan. In fact, even if the bed of food products to be passed through causes a noticeable pressure loss, the intake area makes it possible to stabilize the airflow and/or to form a buffer volume, which limits the suction difficulties of the cross-flow fan.

Advantageously, the ventilation means are arranged on one side of the cooking basket, and/or the ventilation means are arranged over the intake area. The appliance is then compact.

Advantageously, the cross-flow fan comprises a rotor arranged to turn about an axis of rotation, and the intake area has a free space that includes a section in a plane perpendicular to the axis of rotation which presents:

a width (b) greater than or equal to at least 1.5 times, and preferably at least 2 times, a diameter of the rotor, possibly in a direction transverse to a normal direction of the intake nozzle and/or a height (a) greater than or equal to at least 0.8 times, and preferably at least 1 times, a diameter of the rotor, possibly in a direction parallel to a normal direction of the intake nozzle and/or an external wall arranged opposite the cooking space relative to the axis of rotation and/or relative to the normal direction of the intake nozzle, and arranged at a distance (c) from the axis of rotation and/or from the normal direction of the intake nozzle, and/or from a straight line passing through the axis of rotation and parallel to said external wall, of at least 0.5 times, and preferably at least 0.7 times, the diameter of the rotor. Such dimensions of the intake area, or air box, offer good suction conditions for the cross-flow fan, which will then be able to operate at normal and not degraded speed, even with the bed of food products to be passed through.

In other words, the volume of the rotor of the cross-flow fan is $V1=\pi h D^2/4$, while the volume $V2$ of the intake area is preferably greater than or equal to $V1*8/\pi$. One can write $V2 \geq 8V1/\pi$, where D is the cross-flow fan rotor diameter, and h is the length of the cross-flow fan.

In addition, the intake nozzle must be sufficiently far from the walls of the intake area, at least 0.7*D.

Advantageously, the cooking appliance comprises an exhaust area downstream of the ventilation means, arranged between the cooking space and the ventilation means, and the heating means are arranged in the exhaust area, at a distance of at least 0.3 times, and preferably 0.5 times, a diameter of a ventilation means rotor. Such a distance prevents disrupting the operation of the cross-flow fan.

Advantageously, the heating means are at least partially facing the food products to be cooked that are received by the cooking basket. This implementation makes it possible to grill or brown the surface of the food products to be cooked.

Advantageously, the cooking basket has a bottom in the form of a grill. Such a grill limits pressure losses.

Advantageously, the cooking basket is arranged such that it is removable relative to the cooking space, and the cooking basket is arranged to be mounted on the appliance by one side of the latter.

Advantageously, the cooking appliance is portable or transportable. In other words, the cooking appliance is not a fan-assisted oven or a convection oven.

Other characteristics and advantages of this invention will be seen more clearly by reading the following detailed description of an embodiment of the invention, provided as a non-restrictive example, and illustrated by the attached drawings in which.

Figure 1:
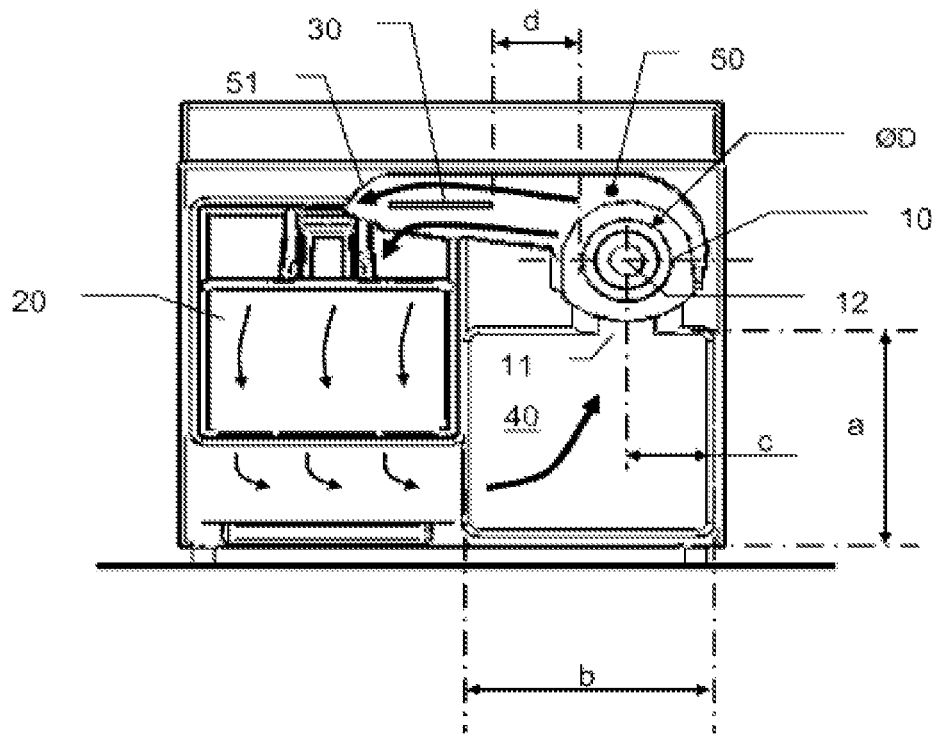
FIG. 1 represents a vertical sectional view of a cooking appliance according to this invention.

FIG. 1 represents a cooking appliance according to this invention in a vertical sectional view. On a left side of the cross section in FIG. 1 is a cooking basket 20 arranged to receive food products to be cooked. On a right side of the cross section are ventilation means arranged to create an airflow, with a cross-flow fan 10 comprising a rotor arranged to turn about an axis of rotation 12 perpendicular to the plane in FIG. 1.

For the sake of clarity, the food products to be cooked are not represented in the cooking basket 20, in order to visualize the airflow generated by the ventilation means. The cross-flow fan 10 draws in air in an intake area 40, and blows it out into an exhaust area 50 defined by a cover 51 which also contains heating means 30. These heating means thus heat the airflow that exits the cross-flow fan 10 and is then directed to the cooking basket 20 by the cover 51.

The cooking basket 20 comprises a bottom with holes, typically a grill, which holds the food products to be cooked (French fries, for example) but allows the airflow to pass through the bed of food products to be cooked and through the bottom.

Once it has passed the grill of the cooking basket 20, the airflow is drawn toward the intake area 40, to again pass through the cross-flow fan 10, through an intake nozzle 11 (centered on the axis of rotation 12).

The airflow thus passes into the cross-flow fan 10, over the heating means 30, through the food products (or through the bed of food products) and then returns to the intake area. Consequently, the airflow is heated just after its passage into the cross-flow fan 10, and just before passing over/through the food products to be cooked. This limits heat losses, because there is no obstacle or major change in direction of the airflow between the heating means 30 and the food products to be cooked. The heat is then transported over a short distance by the airflow and transferred from the heating means 30 to the food products to be cooked. The latter are thus cooked quickly.

Finally, it can be noted on FIG. 1 that at least a portion of the heating means 30 are facing the food products to be cooked, which permits exposing the food products to be cooked to thermal radiation generated by the heating means 30 in order to grill/brown them.

A cross-flow fan 10 is very quiet, because it generates little pressure. However, to obtain good operating conditions for such a cross-flow fan 10, the invention proposes to position immediately upstream of the latter an intake area with a minimal volume, which can be defined by its normal cross section at the axis of rotation 12. In fact, as represented in FIG. 1, the applicant has noticed that by fixing conditions on the height (a), the width (b) and the distance (c) according to the diameter of the rotor of the cross-flow fan 10, the latter operated in good aeraulic conditions.

In particular:
(a) must be at least equal to 0.8 times, and preferably one times, the diameter D of the rotor;
(b) must be at least equal to 1.5*D, and preferably 2*D;
(c) must be at least equal to 0.5*D.

When these conditions are met, the intake area 40 forms a buffer volume and a stabilization area to permit good suction of the cross-flow fan 10.

Downstream of the cross-flow fan 10, it is also important not to create obstacles to the airflow, and in particular, it is advantageous to place the heating means 30 at a minimum distance (d) from the rotor of the cross-flow fan 10. In particular, d must be at least equal to 0.3*D and preferably 0.5*D.

The structure of the cooking appliance is compact because the ventilation means are arranged next to the cooking basket 20, and over the intake area 40. The appliance, while comprising a cross-flow fan 10, is thus compact and very quiet, but still has good convection capabilities, with the intake area 40 ensuring proper operation of the cross-flow fan 10.

Figure 2:
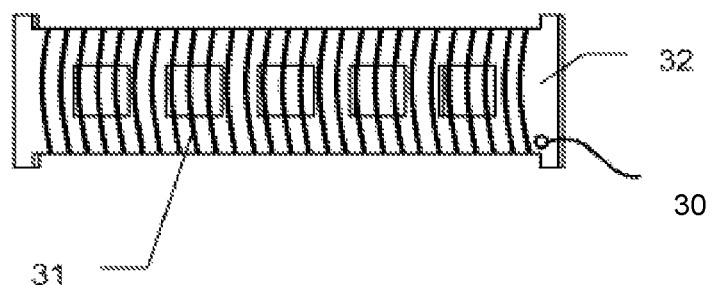
FIG. 2 represents a view of the heating means of the appliance in FIG. 1.

In addition, as represented in FIG. 2, the invention proposes to use a heating wire 31 wound on a flat support 32, such as a mica, for example. The heating wire 31 is wound around the flat support 32 in a succession of turns, but the latter are all spaced by at least one times, and preferably 1.5 times, the diameter of the heating wire 31, in order to allow good ventilation of the heating wire 31. This achieves efficient heat transfer, and also prevents the formation of red spots on the heating wire 31, which could affect its longevity. In addition, we note that the flat support 32 is perforated with multiple openings (five here), still to permit good ventilation.

In addition, this arrangement (the turns being separated from one another) avoids slowing the airflow exiting the cross-flow fan 10, which also ensures quiet operation in good aeraulic conditions.

Finally, again in FIG. 1, we note that the flat support 32 of the heating means is arranged substantially parallel to the streams of airflow in the cover 51, which further limits the pressure losses. Finally, it is advantageous to orient the turns with the heating wire aligned with the airflow. In fact, each turn comprises two portions, each on either side of the flat support 32, which may be considered straight, these two portions are then aligned with the airflow to limit the resistance to the flow.

The cooking basket 20, visible in FIG. 1, is removable relative to the cooking appliance, and it can be installed/removed with a movement substantially parallel to the axis of rotation 12, that is, a movement perpendicular to the plane of FIG. 1.

According to an embodiment variant, in order to reduce the risks of appearance of red spots on the heating wire 31 of the heating means 30, fresh air is supplied at the extremities of the cross-flow fan 10. This fresh air coming from outside the appliance enters the cross-flow fan 10 through inlets (not represented) made close to the extremities of the cross-flow fan 10.

Such a cooking appliance may be used to quickly cook cut potatoes in order to make French fries by initially coating them with a small quantity of oil or fat.

Cooking of other food products, such as meat or other vegetables, can also be envisioned.

It will be understood that various modifications and/or improvements obvious to the person skilled in the art may be made to various embodiments of the invention described in this description without departing from the context of the invention defined by the attached claims.

The invention claimed is:

1. A cooking appliance comprising:
a ventilation system arranged to create an airflow in a cooking space of the appliance; a cooking basket, arranged to receive food products to be cooked in the cooking space and allowing the airflow to pass through a bed of food products to be cooked, and
a heating system arranged to heat the airflow, wherein the ventilation system comprises a cross-flow fan, and wherein, in the airflow:
the heating system is arranged downstream of the ventilation system, and the cooking basket is arranged downstream of the heating system,
wherein the heating system is a joule effect heating system,
wherein the heating system comprises a heating wire of a predetermined diameter, wound around a flat support on a plurality of turns, and wherein the wire of one turn is spaced from the wire of the adjacent turn by a distance of at least 1.5 times the diameter of the wire,
wherein the flat support is made of mica.

2. The cooking appliance according to claim 1, wherein the flat support of the heating system is arranged so as to be parallel to a direction of flow of the airflow at the heating system, or wherein each turn of heating wire presents two strait portions aligned with said direction of flow of the airflow.

3. The cooking appliance according to claim 1, comprising an intake area upstream of the ventilation system, arranged between the cooking space and the ventilation system, and in communication with the ventilation system through an intake nozzle.

4. The cooking appliance according to claim 3, wherein the ventilation system is arranged on one side of the cooking basket, or wherein the ventilation system is arranged over the intake area.

5. The cooking appliance according to claim 3, wherein the cross-flow fan comprises a rotor arranged to turn about an axis of rotation, and wherein the intake area has a free space that includes a section in a plane perpendicular to the axis of rotation which presents:
a width greater than or equal to at least 1.5 times a diameter of the rotor,
a height greater than or equal to at least 0.8 times the diameter of the rotor, or
an external wall arranged opposite the cooking space relative to the axis of rotation, and arranged at a distance from the axis of rotation of at least 0.5 times the diameter of the rotor.

6. The cooking appliance according to claim 1, comprising an exhaust area downstream of the ventilation system, arranged between the cooking space and the ventilation system, and wherein the heating system is arranged in the exhaust area, at a distance of at least 0.3 times a diameter of a rotor of the ventilation system.

7. The cooking appliance according to claim 1, wherein the heating system is at least partially facing the food products to be cooked that are received by the cooking basket.

8. The cooking appliance according to claim 1, wherein the cooking basket has a bottom in the form of a grill.

9. The cooking appliance according to claim 1, wherein the cooking basket is arranged such that the cooking basket is removable relative to the cooking space, and wherein the cooking basket is arranged to be mounted on the appliance by one side of the appliance.

* * * * *